US008651467B2

(12) United States Patent
Ishikawa et al.

(10) Patent No.: US 8,651,467 B2
(45) Date of Patent: Feb. 18, 2014

(54) FLUID-FILLED TYPE VIBRATION DAMPING DEVICE

(75) Inventors: Ryota Ishikawa, Komaki (JP); Yuichi Ogawa, Kasugai (JP); Yorishige Shimizu, Iwakura (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 141 days.

(21) Appl. No.: 13/215,852

(22) Filed: Aug. 23, 2011

(65) Prior Publication Data

US 2012/0049423 A1 Mar. 1, 2012

(30) Foreign Application Priority Data

Aug. 31, 2010 (JP) ................................. 2010-193309

(51) Int. Cl.
*F16F 9/00* (2006.01)
*F16F 9/34* (2006.01)
*F16F 15/023* (2006.01)

(52) U.S. Cl.
USPC .................................................. 267/140.13

(58) Field of Classification Search
USPC ....................... 267/140.11–140.13
See application file for complete search history.

(56) References Cited

U.S. PATENT DOCUMENTS

| 4,986,510 A | * | 1/1991 | Bellamy et al. | 267/140.13 |
| 5,853,063 A | * | 12/1998 | Meyerink et al. | 267/140.13 |
| 6,505,822 B1 | * | 1/2003 | Yamamoto et al. | 267/140.13 |
| 6,619,636 B2 | * | 9/2003 | Yamamoto et al. | 267/140.13 |
| 2010/0072683 A1 | | 3/2010 | Saito et al. | |
| 2010/0201053 A1 | | 8/2010 | Okumura et al. | |
| 2011/0101581 A1 | | 5/2011 | Kubo et al. | |

FOREIGN PATENT DOCUMENTS

| JP | 2006132615 A | * | 5/2006 |
| JP | 2009002420 A | * | 1/2009 |
| JP | 2009052675 A | * | 3/2009 |

* cited by examiner

*Primary Examiner* — Anna Momper
(74) *Attorney, Agent, or Firm* — Oliff PLC

(57) ABSTRACT

A fluid-filled type vibration damping device including a partition member having a moveable film and a short passage interconnecting a pressure receiving chamber and an equilibrium chamber. A valve member that switches between a communicating state and a shut off state of the short passage projects from the moveable film. The valve member has a thick walled part and a thin walled part, the thin walled part being pressed on an inner wall surface of the short passage. A pressure of the pressure receiving chamber is applied through the short passage to a pressure receiving chamber side surface of the thick walled part, while an equilibrium chamber side surface thereof is supported by the partition member. The pressure of the pressure receiving chamber is applied to one side of the thin walled part and a pressure of the equilibrium chamber is applied to another side thereof through the short passage.

6 Claims, 5 Drawing Sheets

FLUID-FILLED TYPE VIBRATION DAMPING DEVICE

INCORPORATED BY REFERENCE

The disclosure of Japanese Patent Application No. 2010-193309 filed on Aug. 31, 2010 including the specification, drawings and abstract is incorporated herein by reference in its entirety.

BACKGROUND OF THE INVENTION

1. Field of the Invention

The present invention relates to, for example, a vibration damping device used for an automobile engine mount or the like, and particularly to a fluid-filled type vibration damping device that utilizes the flow behavior of the fluid sealed inside.

2. Description of the Related Art

Fluid-filled type vibration damping devices are known as one type of vibration damping devices used as automobile engine mounts, sub-frame mounts and the like. These conventional fluid-filled type vibration damping devices includes: a first mounting member; a second mounting member; a main rubber elastic body connecting the first and second mounting members; a pressure receiving chamber and an equilibrium chamber filled with a non-compressible fluid; and an orifice passage by which the pressure receiving chamber and the equilibrium chamber communicate with each other permitting fluid flows through the orifice passage.

Meanwhile, these fluid-filled type vibration damping devices have suffered from the problem that abnormal noise will occur due to cavitation upon input of impulsive large amplitude vibration such as when an automobile rides over a bump. Specifically, when marked negative pressure is applied to the pressure receiving chamber due to input of a shocking, large amplitude vibration, air bubbles due to cavitation are generated in the pressure receiving chamber, and shock waves are emitted when the air bubbles disappear. Then, by those shock waves being transmitted to the vehicle, passengers hear this as noise.

To reduce or prevent this kind of cavitation noise, U.S. Publication No. US 2010/0072683, for example, proposes a structure provided with a leak passage (short passage) which opens when marked negative pressure occurs in the pressure receiving chamber. Namely, U.S. Publication No. US 2010/0072683 discloses that a leak passage is formed on a partition member, and also a relief valve (valve member) is formed as an integral unit with a moveable film to open and close the leak passage, and when negative pressure of a level for which cavitation will occur is applied to the pressure receiving chamber, the relief valve is deformed and the leak passage is opened. With this arrangement, the flow of fluid through the leak passage reduces the negative pressure of the pressure receiving chamber, and the noise due to cavitation is reduced or prevented.

However, according to the structure proposed by U.S. Publication No. US 2010/0072683, the relief valve is a thin film form having a uniform thickness entirely. Therefore, when negative pressure occurs in the pressure receiving chamber, the entire relief valve easily becomes greatly deformed, and the leak passage is in a communicating state. This causes escape of the pressure fluctuation of the pressure receiving chamber through the leak passage when vibration is input. Additionally, even if the relief valve is maintained in a shut off state, the pressure fluctuation of the pressure receiving chamber escapes to the equilibrium chamber side due to the elastic deformation of the relief valve itself. As a result, the fluid flow volume through the orifice passage decreases, possibly causing adverse effect on the vibration damping effect characteristics exhibited by the orifice passage.

It is conceivable that the deformation spring characteristics would solidify by increasing the relief valve thickness, but in conjunction with the thick walled part of both sides of the circumferential direction of the relief valve being formed integrally and being restrained, it is very difficult to adjust the deformation spring characteristics of the relief valve to a suitable value. Moreover, a thin film form relief valve is formed projecting from the outer circumference end surface of the maximum thickness fixed part formed on the outer circumference edge part of the moveable film. Accordingly, cracks or damage are likely to occur due to marked stress concentration on the base part of the relief valve, making it difficult to ensure durability and reliability.

SUMMARY OF THE INVENTION

It is therefore one object of this invention to provide a fluid-filled type vibration damping device of novel structure that prevents cavitation noise with rapid opening of the short passage when marked negative pressure is applied to the pressure receiving chamber, and that effectively exhibits a vibration damping effect using an orifice passage for which the short passage is held in a shut off state when positive pressure is applied to the pressure receiving chamber.

A first mode of the present invention features a fluid-filled type vibration damping device comprising: a first mounting member; a second mounting member; a main rubber elastic body connecting the first and second mounting members; a partition member supported by the second mounting member; a pressure receiving chamber whose wall portion is partially defined by the main rubber elastic body; an equilibrium chamber whose wall portion is partially defined by a flexible film, the pressure receiving chamber and the equilibrium chamber being disposed on either side of the partition member and filled with a non-compressible fluid; an orifice passage permitting communication between the pressure receiving chamber and the equilibrium chamber; a moveable film disposed in the partition member, the moveable film having a film portion that receives on one side thereof a pressure of the pressure receiving chamber and on another side thereof a pressure of the equilibrium chamber, and an annular retaining portion integrally formed on a location of an outer peripheral side of the film portion while being supported by the partition member; a short passage formed in the partition member at a location of an outer peripheral side of a support portion that supports the annular retaining portion of the moveable film for permitting communication between the pressure receiving chamber and the equilibrium chamber; and a valve member that switches between a communicating state and a shut off state of the short passage being provided projecting to the outer peripheral side from the annular retaining portion, the valve member having a thick walled part projecting from the annular retaining portion to the outer peripheral side and a thin walled part which gradually becomes thinner toward a projection tip side projecting further to the outer peripheral side from the thick walled part, wherein the thin walled part rises toward a pressure receiving chamber side within the short passage and is elastically pressed on an inner wall surface of the short passage, wherein the pressure of the pressure receiving chamber is applied through the short passage to a pressure receiving chamber side surface of the thick walled part, while an equilibrium chamber side surface of the thick walled part is in contact with and supported by the partition member, and wherein the pressure of the pressure receiving chamber is applied to one side of the thin walled part and the pressure of the equilibrium chamber is applied to another side of the thin walled part through the short passage.

According to the fluid-filled type vibration damping device of the first mode of the present invention, when there is input of shocking, large amplitude vibration for which noise can be generated due to cavitation, the negative pressure of the pressure receiving chamber is reduced or eliminated by inflow of fluid to the pressure receiving chamber from the equilibrium chamber through the short passage. With this arrangement, the generation of air bubbles due to a marked decrease in pressure of the pressure receiving chamber is prevented, so noise due to shock waves when the air bubbles disappear is reduced or avoided.

Moreover, the tip part of the valve member that switches between the communicating state and the shut off state of the short passage is a thin walled part that deforms relatively easily. By switching to the communicating state of the short passage by deformation of the thin walled part, the marked negative pressure applied to the pressure receiving chamber is quickly eliminated. Accordingly, the generation of cavitation noise is prevented at a higher level, and quietness is improved.

In addition, by the thin walled part rising facing the pressure receiving chamber side within the short passage, the suction force applied to the thin walled part based on the negative pressure of the pressure receiving chamber operates in the direction (inner peripheral side) for which the thin walled part separates from the inner wall surface of the short passage. With this arrangement, when negative pressure of a level for which cavitation will become a problem is applied to the pressure receiving chamber, the thin walled part is swiftly separated from the inner surface of the short passage, and the short passage opens to a communicating state. As a result, the negative pressure of the pressure receiving chamber is quickly eliminated, and the generation of noise due to cavitation is prevented.

Also, by providing the moveable film with the valve member that switches between the communicating state and the shut off state of the short passage according to the relative pressure difference between the pressure receiving chamber and the equilibrium chamber, the short passage is kept in the shut off state during normal vibration input or when positive pressure is applied to the pressure receiving chamber. Thus, the volume of fluid flowing through the orifice passage is ensured, and the vibration damping effect is effectively exhibited based on the fluid flow behavior.

Furthermore, the base end part of the valve member, which projects from the annular retaining portion, is a thick walled part, and the stability of the shape is increased. Accordingly, when positive pressure is operating and during normal vibration input, the short passage is stably kept in a shut of state, and the vibration damping effects due to the orifice passage are effectively exhibited.

Moreover, the equilibrium chamber side surface of the thick walled part is in contact with the partition member. When positive pressure is applied to the pressure receiving chamber, the thick walled part is supported by the partition member, and the valve member deformation is made to be restricted. With this arrangement, in a state when positive pressure is applied to the pressure receiving chamber such that cavitation is not a problem, escaping of the fluid pressure of the pressure receiving chamber through the short passage is prevented, and it is possible to efficiently ensure the volume of fluid that flows through the orifice passage. This makes it possible to effectively obtain a vibration damping effect based on the fluid flow behavior.

Furthermore, the thin walled part of the valve member rises facing the pressure receiving chamber side within the short passage, and is elastically pressed against the inner wall surface of the short passage. Therefore, when positive pressure is applied to the pressure receiving chamber, the thin walled part is pressed more strongly on the inner wall surface of the short passage by the fluid pressure effect, and the short passage is kept in the shut off state. As a result, the volume of fluid flowing through the orifice passage is ensured, and the vibration damping effect which is the objective is effectively exhibited.

A second mode of the present invention provides the fluid-filled type vibration damping device according to the first mode, wherein with a free form of the valve member as itself, the thin walled part slopes and rises facing the pressure receiving chamber side with a tapered shape.

With the second mode, the thin walled part of the valve member being provided on a moveable film having a tapered shape which slants and rises facing one surface side (the pressure receiving chamber side) in advance. This makes it possible to prevent the application of large distortion or stress to the valve member when mounting to the partition member of the moveable film, and to improve durability.

Note that the free form of the valve member as itself means the shape of the valve member in a free state when external force is not applied to the valve member, before attaching the moveable film to the partition member.

A third mode of the present invention provides the fluid-filled type vibration damping device according to the first or second mode, wherein the annular retaining portion is gripped in a thickness direction of the moveable film by the partition member, and the annular retaining portion is provided with a holding projection projecting in the thickness direction of the moveable film while being pressed by the partition member.

With the third mode, when the annular retaining portion is gripped by the partition member, the holding projection is pressed by the partition member. This arrangement can prevent that the compression pressure applied from the partition member to the moveable film is transmitted to the film portion that locates at the inner peripheral side of the annular retaining portion, and to the valve member that locates at the outer peripheral side of the annular retaining portion. This makes it possible to set the vibration damping characteristics which are the object of the film portion and the opening and closing characteristics for the valve member to a high precision level, and also to improve the durability of the moveable film. Furthermore, compression pressure is efficiently applied via the holding projection to the annular retaining portion, so the moveable film is stably fixed and supported by the partition member.

A fourth mode of the present invention provides the fluid-filled type vibration damping device according to any of the first through third modes, wherein the short passage is constituted by including an annular housing extending circumferentially in an interior of the partition member and a communication hole that connects the annular housing to the pressure receiving chamber and the equilibrium chamber, and the valve member of the moveable film is formed in a ring form extending along an entire circumference of the annular retaining portion, and is disposed in the annular housing.

With the fourth mode, the ring shaped valve member is disposed in the annular housing that constitutes part of the short passage. Thus, when there is a marked decrease in pressure of the pressure receiving chamber, the valve member is elastically deformed along the entire circumference, and is separated from the inner wall surface of the short passage.

With this arrangement, the substantial cross sectional area of the short passage is efficiently increased in relation to the deformation volume of the valve member, the negative pressure of the pressure receiving chamber is quickly eliminated, and the generation of noise due to cavitation is prevented.

According to the present invention, during normal vibration input and during positive pressure action on the pressure receiving chamber, keeping of the shut off state of the short passage by the valve member is stably realized, the volume of fluid flowing through the orifice passage is sufficiently ensured, and the target vibration damping effect based on the fluid flow behavior is effectively exhibited. Meanwhile, when marked negative pressure is applied to the pressure receiving chamber, the short passage is switched to the communicating state by the valve member separating from the inner wall surface of the short passage by an amount according to the negative pressure of the pressure receiving chamber, the negative pressure of the pressure receiving chamber is quickly eliminated by the flow of fluid through the short passage, and the generation of noise due to cavitation is prevented.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIG. 7A shows a case when relatively small negative pressure for which cavitation becomes a problem is applied to a pressure receiving chamber, and FIG. 7B shows a case when relatively large negative pressure for which cavitation becomes a problem is applied to the pressure receiving chamber.

DETAILED DESCRIPTION OF PREFERRED EMBODIMENTS

Figure 1:
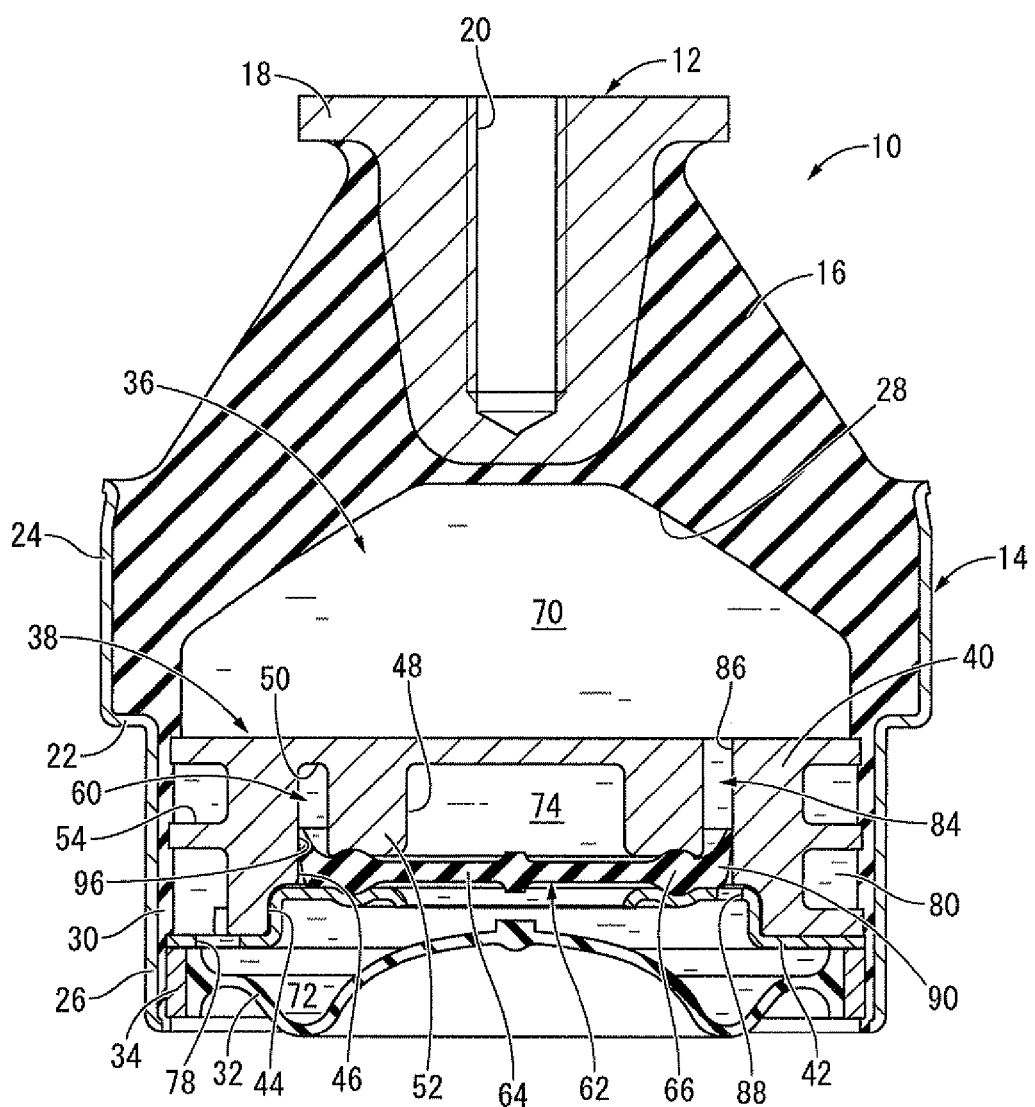
FIG. 1 is a longitudinal cross sectional view of a fluid-filled type vibration damping device in the form of an engine mount according to one embodiment of the present invention.
Figure 2:
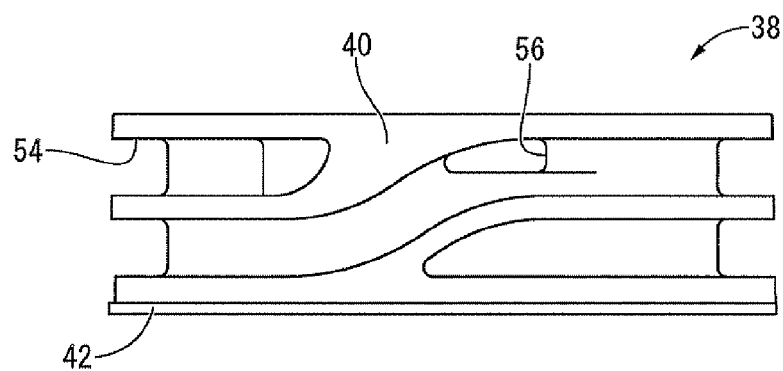
FIG. 2 is a front view of a partition member of the engine mount of FIG. 1.

FIG. 1 shows an automobile engine mount 10 as an embodiment of a fluid-filled type vibration damping device with a constitution according to the present invention. The engine mount 10 has a structure wherein a first mounting member 12 and a second mounting member 14 are connected by a main rubber elastic body 16. Then, by the first mounting member 12 being attached to a power unit (not illustrated), and also the second mounting member 14 being attached to a vehicle body (not illustrated), the power unit is made to be supported with vibration damping by the vehicle body. Note that with the description below, the vertical direction means as a rule the vertical direction in FIG. 1.

In more detail, the first mounting member 12 has a solid, roughly circular block shape and also, at its tip edge part, has a flange part 18 projecting in the direction perpendicular to the axis formed as an integral unit along the entire circumference. Also, a bolt hole 20 for which a screw thread is engraved on the inner circumference surface is formed on the central axis of the first mounting member 12, and that bolt hole 20 opens at the top surface of the first mounting member 12.

Meanwhile, the second mounting member 14 has a thin walled, large diameter, roughly cylindrical shape. The second mounting member 14 has a step part 22 provided at the axial direction center part, with the top side being a large diameter cylinder 24 facing the step part 22, and with the bottom side being a small diameter cylinder 26 facing the step part 22.

The first mounting member 12 and the second mounting member 14 are disposed on the same central axis. The first mounting member 12 is arranged above the second mounting member 14. The first mounting member 12 and the second mounting member 14 are elastically connected by the main rubber elastic body 16.

The main rubber elastic body 16 has a thick walled large diameter roughly conical shape. The end part of the small diameter side (top side) of the main rubber elastic body 16 is vulcanization adhered to the first mounting member 12. The outer circumference surface of the end part of the large diameter side (bottom side) of the main rubber elastic body 16 is overlapped on the inner circumference surface of the large diameter cylinder 24 of the second mounting member 14 and vulcanization adhered. Also, an inverted roughly bowl shaped large diameter recess 28 is formed on the bottom end part of the main rubber elastic body 16, and this opens at the bottom surface of the main rubber elastic body 16. Furthermore, below the main rubber elastic body 16, a thin walled large diameter roughly cylindrical sealing rubber layer 30 is adhered and formed on the inner circumference surface of the small diameter cylinder 26 of the second mounting member 14. Note that the main rubber elastic body 16 is formed as an integral vulcanized molded article equipped with the first mounting member 12 and the second mounting member 14.

Also, a flexible film 32 is attached to the second mounting member 14. The flexible film 32 is a rubber elastic body with a thin walled large diameter roughly round disk shape, and has sufficient slack in the axial direction. The outer circumference surface of the flexible film 32 is overlapped on a ring shaped fixing member 34 and vulcanization adhered. After the fixing member 34 is inserted in the bottom end part of the small diameter cylinder 26 of the second mounting member 14, the flexible film 32 is attached to the second mounting member 14 by implementing diameter reduction processing such as all-direction contraction or the like on the second mounting member 14.

By the flexible film 32 being attached to the second mounting member 14 in this way, the top side aperture of the second mounting member 14 is blocked by the main rubber elastic body 16, and the bottom side aperture of the second mounting member 14 is blocked by the flexible film 32. With this arrangement, a fluid sealing area 36 separated from the outside is formed between the axial direction facing surfaces of the main rubber elastic body 16 and the flexible film 32, and this is filled with a non-compressible fluid. Note that the non-compressible fluid sealed in the fluid sealing area 36 is not particularly restricted, but water or alkylene glycol, polyalkylene glycol, silicone oil, or a mixed solution of these or the like are favorably used. Specifically, to effectively obtain the vibration damping effect based on the fluid behavior effect described later, a low viscosity fluid of 0.1 Pa·s or lower is preferable.

Also, a partition member 38 is housed in the fluid sealing area 36. The partition member 38 has an overall thick walled roughly round disk shape, and is supported by the second mounting member 14. Furthermore, the partition member 38 is formed by combining an upper partition member 40 and a lower partition member 42.

The upper partition member 40 is a thick walled roughly round disk shape, and on the radial direction center part is formed a shallow fitting recess 44 that opens at the bottom surface. Furthermore, a mounting recess 46 that opens at the bottom surface of the fitting recess 44 is formed, and a center recess 48 that opens at the bottom surface of the mounting recess 46 is also formed. On the outer peripheral side of the center recess 48, a circular recess 50 separated by a specified distance is formed so as to open at the upper base of the mounting recess 46, and the bulkhead part that separates the center recess 48 and the circular recess 50 is a support portion 52 that projects downward extending in the circumference direction ring shape.

Also, at the outer circumference edge part of the upper partition member 40, a circumferential groove 54 that extends in a spiral shape with a slightly less than two circumference length in the circumference direction is formed opening at the outer circumference surface. Furthermore, at the length direction center part of the circumferential groove 54, a communication path 56 extending in the radial direction opens, and the circumferential groove 54 and the center recess 48 communicate through the communication path 56. Also, a plurality of fixing pins 58 are formed projecting facing downward between the circumferential groove 54 and the fitting recess 44 in the radial direction.

The lower partition member 42 is a thin walled roughly circular disk shape. By having a step provided at the radial direction middle part, the inner circumference part projects further upward than the outer circumference part. Circular fixing holes 59 corresponding to the fixing pins 58 of the upper partition member 40 are formed by piercing through the outer circumference part of the lower partition member 42.

The upper partition member 40 and the lower partition member 42 constructed as above are overlapped vertically, with the inner circumference part of the lower partition member 42 being fit in the fitting recess 44 of the upper partition member 40, while the fixing pins 58 of the upper partition member 40 being inserted into the fixing holes 59 of the lower partition member 42. Then, the tip of the fixing pin 58 is pushed and mashed to expand the diameter, and by locking to the aperture circumference edge part of the fixing hole 59, the upper partition member 40 and the lower partition member 42 are fixed, and the partition member 38 is formed.

By combining the upper partition member 40 and the lower partition member 42, the mounting recess 46 center part and the center recess 48 open downward through the center hole of the lower partition member 42. Also, by the outer circumference edge part of the mounting recess 46 and the circular recess 50 being covered by the lower partition member 42, an annular housing 60 extending circumferentially in the interior of the partition member 38 is formed.

Also, a moveable film 62 is attached to the partition member 38. The moveable film 62 is formed by a roughly round disk shaped rubber elastic body, with the radial direction center part being a thin walled film portion 64, and an annular retaining portion 66 being integrally formed on the outer peripheral side of the film portion 64.

The film portion 64 is a rubber film having a thin walled roughly round disk shape, and having a larger diameter than the aperture of the center recess 48 of the upper partition member 40, and also being thinner-walled than the distance between the facing surfaces in the axial direction of the support portion 52 of the upper partition member 40 and the inner circumference part of the lower partition member 42.

Figure 6:
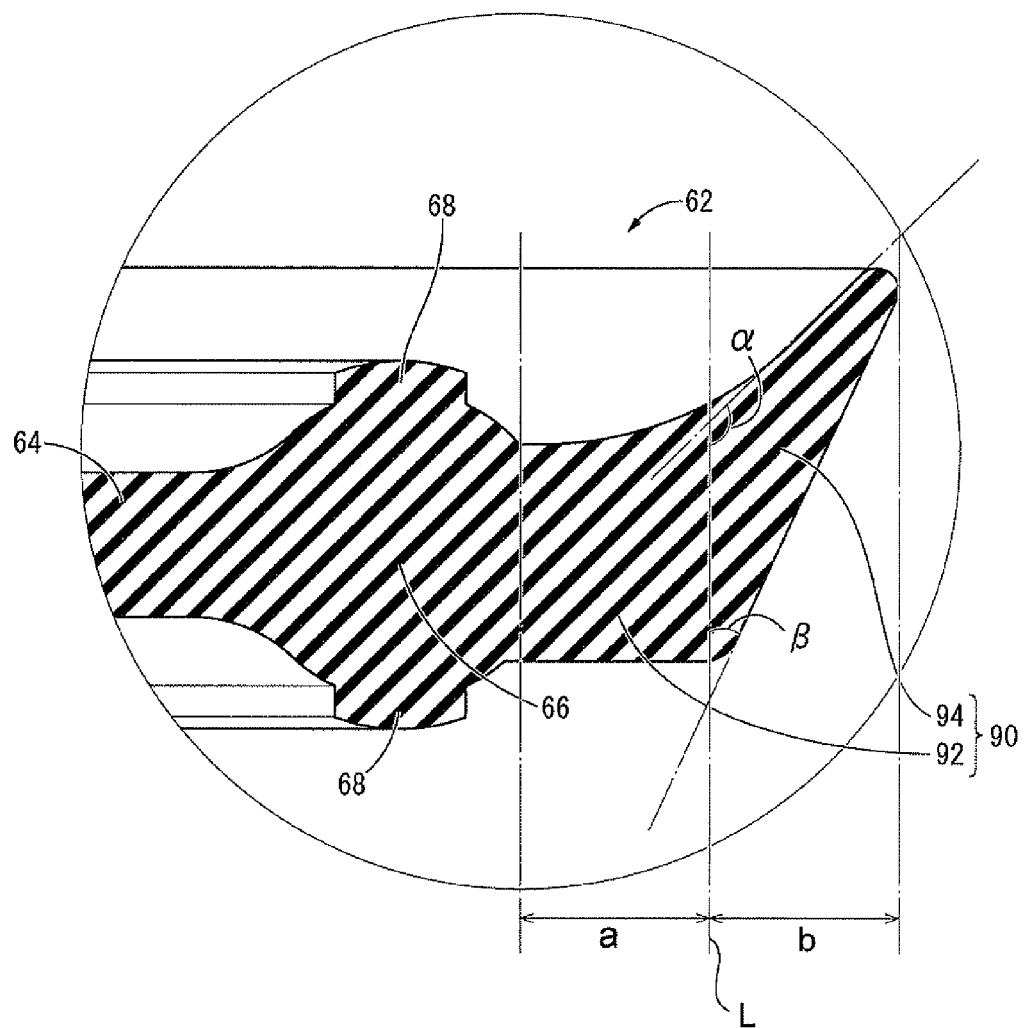
FIG. 6 is an enlarged cross sectional view of a principle part of a moveable film of the engine mount of FIG. 1.

As shown in FIG. 6, the annular retaining portion 66 is integrally formed on the outer peripheral side of the film portion 64, and is continuously extended along the entire circumference at a roughly fixed circular cross section. Also, on the annular retaining portion 66, a pair of holding projections 68, 68 that project at both the top and bottom sides are integrally formed along the entire circumference. Note that as shown in FIG. 6, the film portion 64 and the annular retaining portion 66 are smoothly linked without having any broken points, and the stress concentration with attachment to the partition member 38 described later is avoided.

Then, the moveable film 62 is inserted in the mounting recess 46 of the upper partition member 40, and is disposed between the upper partition member 40 and the lower partition member 42 in the axial direction. In more detail, the moveable film 62 is attached to the partition member 38 by the annular retaining portion 66 of the moveable film 62 being sandwiched and supported between the axial direction facing surfaces of the support portion 52 of the upper partition member 40 and the inner circumference part of the lower partition member 42. Note that in the state with the moveable film 62 mounted on the partition member 38, the aperture of the center recess 48 of the upper partition member 40 and the upper side aperture of the center hole of the lower partition member 42 are covered by the film portion 64 of the moveable film 62.

Also, with the moveable film 62 of this embodiment, the pair of holding projections 68, 68 are formed projecting on the annular retaining portion 66, so those holding projections 68, 68 are pressed in the compression direction between the upper and lower partition members 40 and 42. Accordingly, the moveable film 62 is fixed by sufficient holding force to the partition member 38, and the distortion and stress input to the film portion 64 and a valve member 90 described later are reduced, so improved durability and more stable characteristics can be obtained.

The partition member 38 on which the moveable film 62 is mounted in this way is disposed in the fluid sealing area 36. Specifically, the partition member 38 is inserted from the bottom side aperture on the second mounting member 14, and by overlapping on the lower end surface of the main rubber elastic body 16, is positioned in the axial direction. Then, after arranging the flexible film 32 under the partition member 38, a diameter reduction processing is implemented on the second mounting member 14. As a result, the partition member 38 is supported by the second mounting member 14 and is disposed so as to expand in the direction perpendicular to the axis within the fluid sealing area 36.

By disposing the partition member 38 inside the fluid sealing area 36 in this way, the fluid sealing area 36 faces the partition member 38 and is divided in two vertically. Specifically, at the top side facing the partition member 38, part of the wall is constituted by the main rubber elastic body 16, and a pressure receiving chamber 70 to which the internal pressure fluctuations are applied when vibration is input is formed. Meanwhile, on the bottom side facing the partition member 38, part of the wall is constituted by the flexible film 32, and an equilibrium chamber 72 which can easily tolerate the volume changes is formed. Note that the same non-compressible fluid as with the fluid sealing area 36 is sealed in both the pressure receiving chamber 70 and the equilibrium chamber 72.

Furthermore, by sealing the non-compressible fluid in the center recess 48 of the partition member 38, an intermediate chamber 74 for which part of the wall part is constituted by the moveable film 62 is formed inside the partition member 38. Note that the intermediate chamber 74 is separated by the film portion 64 of the moveable film 62 in relation to the equilibrium chamber 72, and the pressure of the intermediate chamber 74 is applied to the top surface of the film portion 64, and the pressure of the equilibrium chamber 72 is applied to the bottom surface of the film portion 64.

Also, by the outer circumference surface of the partition member 38 overlapping with the second mounting member 14 to be liquid-tight via the sealing rubber layer 30, the outer circumference aperture of the circumferential groove 54 is liquid-tightly covered by the second mounting member 14, and a tunnel shaped flow path extending to a specified length in the circumference direction is formed. One end part of the length direction of the circumferential groove 54 is held in communication with the pressure receiving chamber 70 through a connecting hole 76, and the other end part is held in communication with the equilibrium chamber 72 through a connecting hole 78, thereby providing a first orifice passage 80 by which the pressure receiving chamber 70 and the equilibrium chamber 72 communicate with each other is formed. Note that with the first orifice passage 80, by the ratio (A/L) of the passage cross section area (A) and the passage length (L) being adjusted, the resonance frequency (tuning frequency) of the fluid that flows through the first orifice passage 80 is tuned to a low frequency of about 10 Hz correlating to engine shake.

Furthermore, by having one end part of the length direction of the circumferential groove 54 communicate with the pressure receiving chamber 70 through the connecting hole 76, a second orifice passage 82 by which the pressure receiving chamber 70 and the intermediate chamber 74 communicate is formed using part of the circumferential groove 54 and the communication path 56. This second orifice passage 82 is tuned to a higher frequency than the first orifice passage 80, and is tuned to a mid to high frequency of around several tens of Hz correlating to idling vibration. Note that the pressure of the pressure receiving chamber 70 is transmitted through the second orifice passage 82 to the intermediate chamber 74, and the pressure of the pressure receiving chamber 70 is substantially applied to the top surface of the film portion 64 of the moveable film 62.

Also, a short passage 84 is formed further to the outer peripheral side than the support portion 52 on the partition member 38. The short passage 84 is a hole that pierces through the partition member 38, and is constituted to connect the annular housing 60 formed inside the partition member 38 to the pressure receiving chamber 70 and the equilibrium chamber 72 by an upper communication hole 86 and a lower communication hole 88 serving as communication holes.

Figure 3:
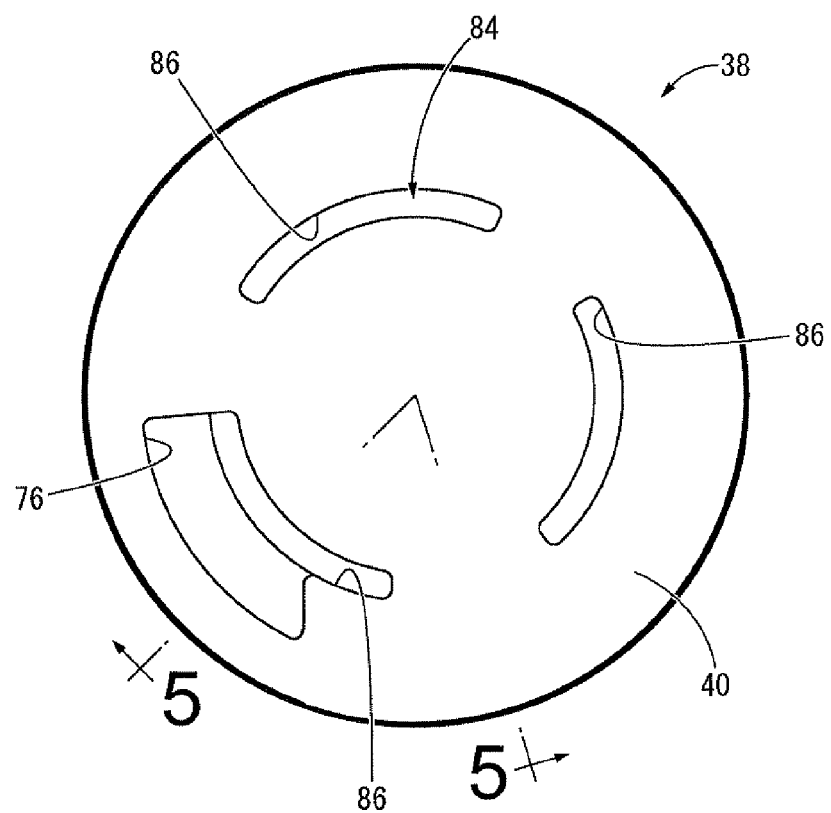
FIG. 3 is a plan view of the partition member of FIG. 2.

The upper communication hole 86 pierces vertically through the upper base wall part of the circular recess 50 at the upper partition member 40, and as shown in FIG. 3, extends to a specified length in the circumference direction. Then, the annular housing 60 communicates with the pressure receiving chamber 70 by three upper communication holes 86 formed separated a specified distance on the circumference.

Figure 4:
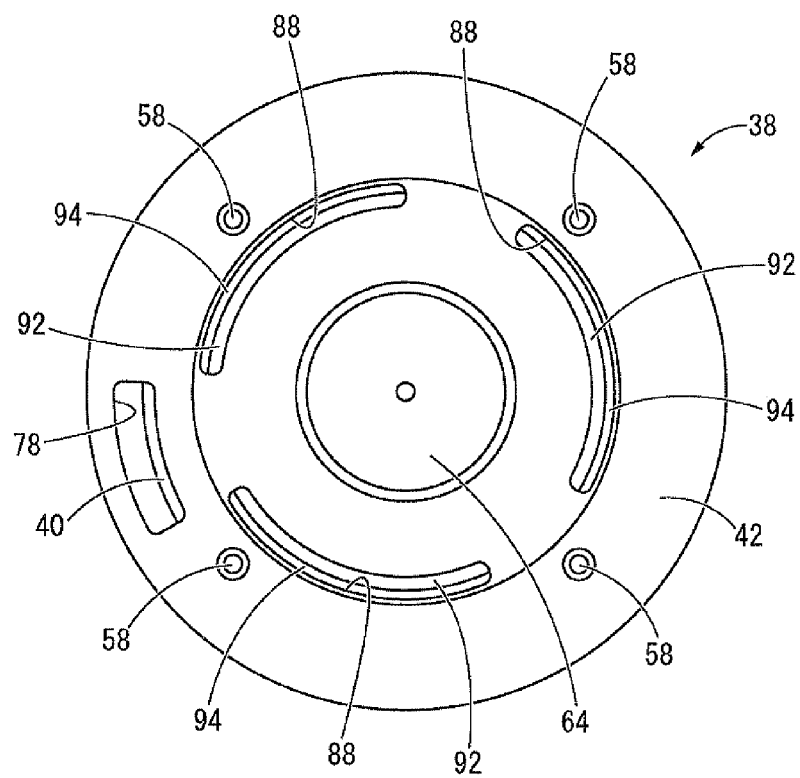
FIG. 4 is a bottom view of the partition member of FIG. 2.
Figure 5:
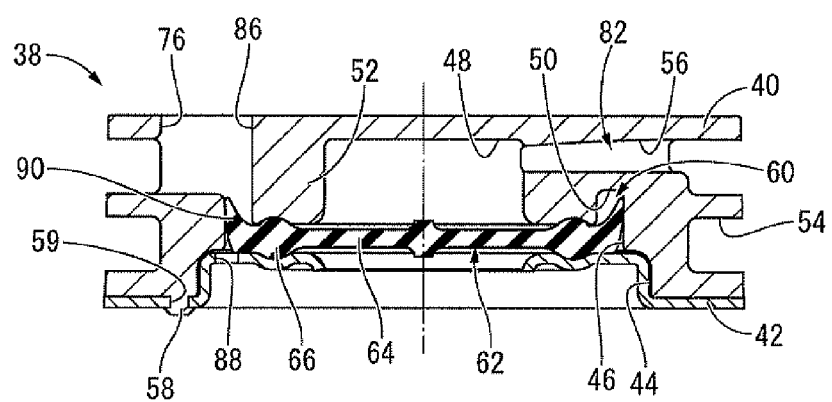
FIG. 5 is a cross sectional view taken along line 5-5 of FIG. 3.

Meanwhile, the lower communication hole 88 pierces vertically through the inner circumference part of the lower partition member 42, and as shown in FIG. 4, extends to a specified length in the circumference direction the same way as the upper communication hole 86. Then, the annular housing 60 communicates with the equilibrium chamber 72 by three lower communication holes 88 formed at positions corresponding to those of the upper communication holes 86.

The short passage 84 is formed by the annular housing 60 and the upper and lower communication holes 86 and 88, it pierces through the partition member 38 in a straight line vertically, and continues in a circumference direction circular shape in the middle part of the lengthwise direction. One end part in the axial direction of the short passage 84 opens at the pressure receiving chamber 70, the other end part opens at the equilibrium chamber 72. Thus, the pressure receiving chamber 70 and the equilibrium chamber 72 communicate with each other through the short passage 84. Note that the short passage 84 is set to have the ratio (A/L) of the passage length and passage cross section area be larger than that of the first orifice passage 80 and the second orifice passage 82, and the flow resistance of the short passage 84 is made to be smaller than the flow resistance of the first and second orifice passages 80 and 82.

Also, the short passage 84 is made to open and close by the valve member 90 provided on the moveable film 62. As shown in FIG. 6, the valve member 90 is a ring shaped part constituting the outermost circumference part of the moveable film 62, projecting to the outer peripheral side from the annular retaining portion 66 along its entire circumference, and is made of a rubber elastic body and is an integral unit with the annular retaining portion 66 and the film portion 64. Also, the valve member 90 has an integrally formed thick walled part 92 and thin walled part 94.

The thick walled part 92 constitutes the base part of the valve member 90, and projects facing outward in the radial direction from the annular retaining portion 66. The thick walled part 92 extends along the entire circumference of the annular retaining portion 66 with an unchanging cross section of generally a rectangular shape as shown in the area: a of FIG. 6. Also, with the thick walled part 92, the bottom surface is a plane shape that expands in a direction roughly perpendicular to the axis, the top surface is a curved surface that gradually tilts upward as the top surface goes to the outer peripheral side, and gradually becomes thick walled facing the outer peripheral side.

The thin walled part 94 constitutes the tip part of the valve member 90, and projects facing further to the outer peripheral side from the thick walled part 92. The thin walled part 94 extends along the entire circumference of the annular retaining portion 66 with an unchanging cross section of generally a triangular shape as shown in the area: b of FIG. 6. The base of the thin walled part 94, which extends along the boundary line: L between the thick walled part 92 and the thin walled part 94, is integrally bonded to an outer circumferential face of the thick walled part 92. Note that the cross sectional area of the thin walled part 94 is smaller than that of the thick walled part 92. Also, with the thin walled part 94, the top surface is a curved surface that gradually tilts upward as the top surface moves to the outer peripheral side, and the bottom surface is a slanted plane that gradually tilts upward as the bottom surface moves to the outer peripheral side. With this arrangement, the thin walled part 94 gradually becomes thin walled toward the tip side, and the projecting tip side rises upward in a free state standing alone before the moveable film 62 is mounted on the partition member 38.

In this respect, as shown in FIG. 6, the angle: α formed by the base of the thin walled part 94 and the top surface of the thin walled part 94 is an obtuse angle, which is preferably within the range $120°\leq\alpha\leq160°$. Meanwhile, the angle: β formed by the base of the thin walled part 94 and the bottom surface of the thin walled part 94 is an acute angle, which is preferably within the range $10°\leq\beta\leq30°$.

Then, by the moveable film 62 equipped with this kind of valve member 90 being attached to the partition member 38, the short passage 84 is shut off by the valve member 90. Specifically, the valve member 90 of the moveable film 62 is disposed in the annular housing 60 and expands inside the mounting recess 46, the tip part of the thin walled part 94 is inserted in the circular recess 50, and in a stationary state, is elastically pressed against an inner wall surface 96 of the outer peripheral side of the short passage 84. With this arrangement, the valve member 90 is disposed in the axial direction between the upper and lower communication holes 86 and 88, and the short passage 84 is shut off by the valve member 90 at the middle part in the lengthwise direction.

Also, with the thick walled part 92 of the valve member 90, the fluid pressure of the pressure receiving chamber 70 is applied through the upper communication hole 86 to its top surface, and its bottom surface overlaps in a state in contact with the inner circumference part of the lower partition member 42 further to the inner peripheral side than the lower communication hole 88. Furthermore, in the axial direction, a slight gap is formed between the base part of the thick walled part 92 and the outer circumference edge of the support portion 52, and the elastic deformation upward (the pressure receiving chamber 70 side) of the thick walled part 92 is allowed even at the base part.

Meanwhile, with the thin walled part 94 of the valve member 90, the fluid pressure of the pressure receiving chamber 70 is applied to its top surface through the upper communication hole 86, and the fluid pressure of the equilibrium chamber 72 is applied to its bottom surface through the lower communication hole 88. Note that the valve member 90 is arranged inside the annular housing 60, and by the annular housing 60 communicating with the pressure receiving chamber 70 and the equilibrium chamber 72 through the upper and lower communication holes 86 and 88, the fluid pressure of the pressure receiving chamber 70 and the equilibrium chamber 72 is applied to the entire circumferential direction of the valve member 90.

In a state with the engine mount 10 having this kind of constitution mounted in a vehicle, when low frequency large amplitude vibration corresponding to engine shake is input, a fluid flow is positively materialized through the first orifice passage 80 based on the relative difference in pressure of the pressure receiving chamber 70 and the equilibrium chamber 72. Thus, the target vibration damping effect (high damping effect) based on the flow behavior such as a fluid resonance effect or the like is exhibited.

Note that during input of low frequency, high amplitude vibration, the deformation of the film portion 64 of the moveable film 62 is restricted, and the second orifice passage 82 is substantially shut off. Accordingly, easing of the internal pressure fluctuation of the pressure receiving chamber 70 due to fluid flow through the second orifice passage 82 is prevented, and the volume of fluid flowing through the first orifice passage 80 is efficiently ensured.

Also, when mid to high frequency, small amplitude vibration correlating to idling vibration is input, fluid flow is positively materialized through the second orifice passage 82 based on the relative pressure difference between the pressure receiving chamber 70 and the intermediate chamber 74. With this arrangement, the target vibration damping effect (low dynamic spring effect) based on flow behavior such as the fluid resonance behavior or the like is exhibited.

Note that during input of higher frequency vibration than the tuning frequency of the first orifice passage 80, the first orifice passage 80 is substantially closed by the anti-resonance, and the flow of fluid through the first orifice passage 80 is prevented. By doing this, the volume of fluid flowing through the second orifice passage 82 is efficiently ensured, and the target vibration damping effect is effectively exhibited.

During input of this kind of normal vibration, as shown in FIG. 1, the short passage 84 is shut off by the valve member 90, and flow of fluid through the short passage 84 is prevented. In particular, by the thin walled part 94 of the valve member 90 pressing on the inner wall surface 96 of the short passage 84 in advance, during normal vibration input, the thin walled part 94 is held without separating from the inner wall surface 96 of the short passage 84, and the short passage 84 is maintained in a shut off state.

Furthermore, the valve member 90 shape stability is increased by the thick walled part 92, and since the short passage 84 is kept in a stable, closed state during normal vibration input, the vibration damping effect by the orifice passages 80 and 82 is exhibited effectively. Moreover, since the valve member 90 is kept in a closed state, escape of the pressure of the pressure receiving chamber 70 to the equilibrium chamber 72 by means of elastic deformation of the valve member 90 is prevented, and the flow of fluid through the orifice passages 80 and 82 is effectively initiated.

Furthermore, by having the bottom surface of the thick walled part 92 overlapped in a state in contact with the lower partition member 42, when positive pressure is applied to the pressure receiving chamber 70, the thick walled part 92 is pressed against the lower partition member 42, and elastic deformation of the thick walled part 92 is prevented. Accordingly, during the action of the positive pressure, the flow of fluid through the orifice passages 80 and 82 is efficiently initiated, and the target vibration damping effect is effectively exhibited.

Moreover, with the thick walled part 92 having the cross section of generally a rectangular shape as mentioned previously, pressure-receiving area of its top surface and pressure-receiving area of its bottom surface are made substantially equal to each other. Thus, the bottom surface of the thick walled part 92 is stably supported by the lower partition member 42. Accordingly, when positive pressure of the pressure receiving chamber 70 is applied to the top surface of the thick walled part 92, the thick walled part 92 is prevented from being elastically deformed in the downward direction.

In addition, the top surface of the thin walled part 94 has a curved tapered shape, and the thin walled part 94 rises slanting toward the pressure receiving chamber 70, so when positive pressure is applied to the pressure receiving chamber 70, the thin walled part 94 is pressed on the inner wall surface 96 of the short passage 84. Because of that, opening of the short passage 84 due to elastic deformation of the thin walled part 94 is prevented, and by ensuring the volume of fluid flowing through the orifice passages 80 and 82, the target vibration damping effect is effectively exhibited.

Besides, as mentioned previously, with the thin walled part 94 having the cross section of generally a triangular shape, the angle: α is an obtuse angle and the angle: β is an acute angle as shown in FIG. 6. With this arrangement, when positive pressure of the pressure receiving chamber 70 is applied to the top surface of the thin walled part 94 and the thin walled part 94 is elastically deformed in the downward direction, a long contact surface between the bottom surface of the thin walled part 94 and the inner wall surface 96 of the short passage 84 is obtained, increasing frictional resistance. This will advantageously prevents the tip part of the valve member 90 from being elastically deformed toward the equilibrium chamber 72 side and producing an opening between the tip part of the valve member 90 and the inner wall surface 96 of the short passage 84.

Meanwhile, by input of a shocking, large amplitude vibration between the first mounting member 12 and the second mounting member 14 when a vehicle rides over a bump on the road surface or the like, when there is a marked reduction in pressure of the pressure receiving chamber 70, noise due to cavitation occurs. In light of that, with the engine mount 10, by the valve member 90 being elastically deformed based on the relative pressure difference between the pressure receiving chamber 70 and the equilibrium chamber 72, the short passage 84 opens and is switched to a communicating state.

Figure 7A:
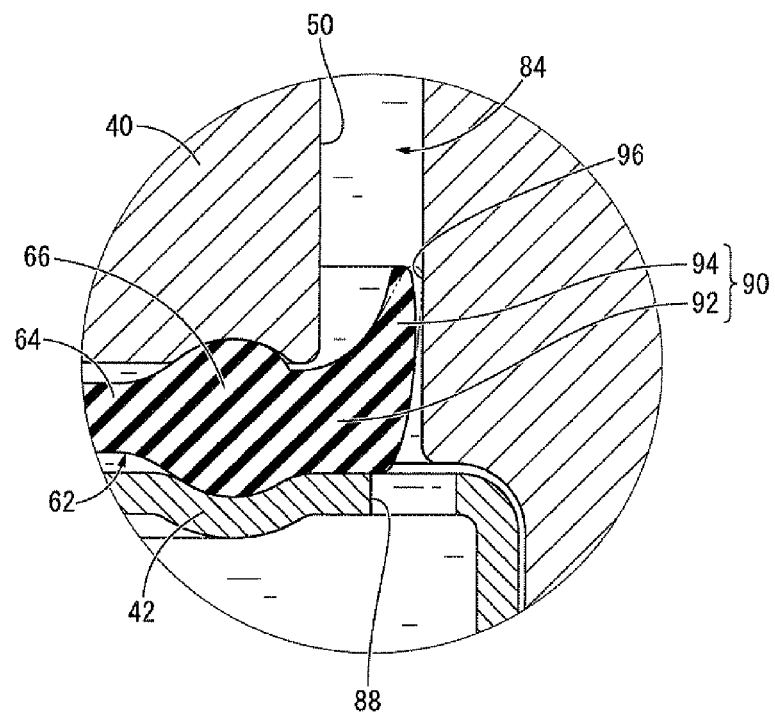
FIGS. 7A and 7B show a principle part enlarged cross sectional view for explaining the operation of a valve member of the engine mount shown in FIG. 1, where

Specifically, when large amplitude vibration of a level for which cavitation noise will occur is input, and marked negative pressure is applied to the pressure receiving chamber 70, suction based on the negative pressure of the pressure receiving chamber 70 acts on the top surface of the thin walled part 94, and the thin walled part 94 is suctioned to the pressure receiving chamber 70 side and the inner peripheral side. Then, as shown in FIG. 7A, the tip part of the valve member 90 is separated from the inner wall surface 96 of the short passage 84, and the short passage 84 switches to the communicating state. With this arrangement, the pressure receiving chamber 70 and the equilibrium chamber 72 communicate with each other through the short passage 84 with a smaller flow resistance than the first and second orifice passages 80 and 82, and the fluid flows from the equilibrium chamber 72 to the pressure receiving chamber 70 based on the relative pressure difference of these chambers 70 and 72. As a result, the negative pressure of the pressure receiving chamber 70 is reduced, the generation of air bubbles due to cavitation is prevented, and noise that occurs during the disappearance of air bubbles is decreased or avoided.

Figure 7B:
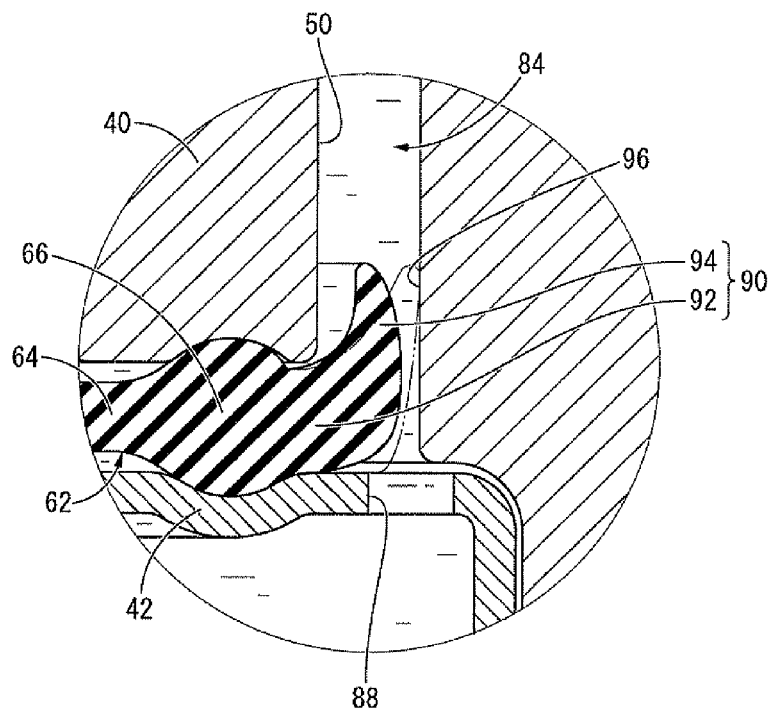

Furthermore, when the negative pressure applied to the pressure receiving chamber 70 is of a level so marked that it cannot be resolved even with the negative pressure easing operation as described above, the valve member 90 is more greatly elastically deformed, so that there is an increase in the volume of fluid flowing through the short passage 84. Specifically, by a strong suction being applied to the top surface of the thick walled part 92 based on the negative pressure of the pressure receiving chamber 70, the thick walled part 92 is suctioned to the pressure receiving chamber 70 side and the inner peripheral side. Accordingly, as shown in FIG. 7B, roughly the entire valve member 90 including the thick walled part 92 is elastically deformed, and a large gap is formed between the valve member 90 and the inner wall surface 96 of the short passage 84. As a result, by increasing the volume of fluid flowing into the pressure receiving chamber 70 from the equilibrium chamber 72 through the short passage 84, and more effectively reducing or eliminating the negative pressure of the pressure receiving chamber 70, noise due to cavitation is prevented. Note that with FIGS. 7A and 7B, the valve member 90 before deformation is shown by a 2 dot-dash line.

In other words, provided on the valve member 90 is a thin walled part 94 that opens the short passage 84 with a sensitive and rapid response even when the negative pressure acting on the pressure receiving chamber 70 is relatively small, and a thick walled part 92 that increases the opening volume of the short passage 84 by deforming only when a marked negative pressure acts on the pressure receiving chamber 70. Because of that, the substantial cross section area of the short passage 84 is adjusted according to the level of the negative pressure applied to the pressure receiving chamber 70, and the negative pressure of the pressure receiving chamber 70 that is a cause of cavitation is reduced as quickly as possible with stability.

Particularly with the engine mount 10, the thin walled part 94 of the valve member 90 rises up tilting toward the pressure receiving chamber 70 side, and in a stationary state, the outer circumference surface of the thin walled part 94 is in contact with the inner wall surface 96 of the short passage 84. Because of that, when there is a marked reduction in pressure of the pressure receiving chamber 70, the suction due to negative pressure acts in a direction to separate the thin walled part 94 from the inner wall surface 96 of the short passage 84. As a result, when a marked negative pressure is applied to the pressure receiving chamber 70, switching of the short passage 84 to the communicating state is executed rapidly, and the negative pressure of the pressure receiving chamber 70 is quickly reduced.

In addition, as mentioned previously, with the thin walled part 94 having the cross section of generally a triangular shape, the angle: α is an obtuse angle and the angle: β is an acute angle as shown in FIG. 6. With this arrangement, the pressure-receiving area of the top surface of the thin walled part 94 is larger in comparison with the case where, for example, the top surface of the thin walled part extends in the direction orthogonal to the center axis. Accordingly, when a marked negative pressure is applied to the pressure receiving chamber 70, the thin walled part 94 is rapidly suctioned to the pressure receiving chamber 70 side and the inner peripheral side, advantageously avoiding cavitation.

Furthermore, in addition to the valve member 90 having a ring shape, by the valve member 90 being arranged in the annular housing 60 that extends in the circumferential direction, the pressure of the pressure receiving chamber 70 is applied to the entire circumferential direction of the valve member 90. Because of that, when there is a marked pressure reduction of the pressure receiving chamber 70, gaps between valve member 90 and the inner wall surface 96 of the short passage 84 are formed along the entire circumference, and a substantial aperture area is efficiently ensured for the short passage 84 in relation to the deformation volume of the valve member 90. As a result, when switching the valve member 90 between the short passage 84 communicating state and shut off state, the switching operation is made to be faster, and it is possible to effectively obtain both a vibration damping effect exhibited in the shut off state, and a cavitation sound prevention effect exhibited in the communicating state.

Also, the valve member 90 gradually becomes thinner-walled toward the projection tip, and local concentration of stress with the valve member 90 is prevented, so it is possible to prevent damage to the valve member 90 by long term repeated opening and closing operation, thus improving durability.

While the present invention has been described in detail in its presently preferred embodiment, for illustrative purpose only, it is to be understood that the invention is by no means limited to the details of the illustrated embodiment, but may be otherwise embodied. For example, a plurality of through holes pierce through the upper base wall part of the center recess 48, and the pressure receiving chamber 70 and the intermediate chamber 74 are always communicating through the through holes, and by part of the wall part of the intermediate chamber 74 being constituted by the film portion 64 of the moveable film 62, it is also possible to restrict fluid flow through the through holes during input of low frequency, high amplitude vibration. In this way, the moveable film 62 is not necessarily limited to items used for controlling fluid flow of the second orifice passage 82.

The shape of the annular retaining portion 66 of the moveable film 62 is not particularly limited, and for example a square cross section annular retaining portion can also be used. Furthermore, the specific shape of the holding projection 68 that is provided projecting on the annular retaining portion 66 of the moveable film 62 is not particularly restricted, and for example it is also possible to have a semicircular cross section or a triangular cross section that gradually becomes narrower in width facing the projection tip.

With the thin walled part 94 of the valve member 90, the free foam of the valve member 90 standing alone (the shape in a state when force is not acting before attachment of the moveable film 62 to the partition member 38) does not absolutely have to be a taper shape that tilts upward toward the outer peripheral side. In specific terms, for example for the free form of the valve member 90 standing alone, it is also possible to have the thin walled part 94 project in the outward radial direction and expand while tilting in the direction perpendicular to the axis or downward, and by mounting on the partition member 38, to have the thin walled part 94 pressed on the inner wall surface 96 of the short passage 84 and deformed, and to rise tilting toward the pressure receiving chamber 70 side. With this arrangement, the valve member 90 is pressed more strongly on the inner wall surface 96 of the short passage 84 by its own elasticity, and the short passage 84 is more stably kept in a shut off state during normal vibration input and when positive pressure is acting on the pressure receiving chamber 70.

Also, the valve members 90 are not necessarily limited to being formed along the entire circumference, but it is also possible to have a single valve member 90 formed on part of the circumferential direction, and to have a plurality of valve members 90 formed independently from each other on the circumference. In this case, the valve member placement area on the short passage 84 does not have to be a ring shape, and it is possible to favorably use a straight line short passage 84 that pierces the partition member 38 in the vertical direction at the position at which the valve member 90 is provided on the circumference of the partition member 38. Furthermore, for example, it is also possible to have the thick walled gripping part provided projecting to the outer peripheral side from the annular retaining portion 66 be formed at a position with the valve member 90 removed on the circumference of the moveable film 62, and to have the gripping part be supported by the partition member 38.

Also, the present invention is applied not only to fluid-filled type vibration damping devices for automobiles, but can also be used for fluid-filled type vibration damping devices for motorcycles, rail vehicles, industrial vehicles and the like. Furthermore, the application scope of the present invention is not limited to fluid-filled type vibration damping devices used as engine mounts, but for example can also be used for various types of fluid-filled type vibration damping devices such as body mounts, sub-frame mounts, differential mounts, and the like.

What is claimed is:

1. A fluid-filled type vibration damping device comprising:
a first mounting member;
a second mounting member;
a main rubber elastic body connecting the first and second mounting members;
a partition member supported by the second mounting member;
a pressure receiving chamber whose wall portion is partially defined by the main rubber elastic body;
an equilibrium chamber whose wall portion is partially defined by a flexible film, the pressure-receiving chamber and the equilibrium chamber being disposed on either side of the partition member and filled with a non-compressible fluid;
an orifice passage permitting communication between the pressure receiving chamber and the equilibrium chamber;
a moveable film disposed in the partition member, the moveable film having a film portion that receives on one side thereof a pressure of the pressure receiving chamber and on another side thereof a pressure of the equilibrium chamber, and an annular retaining portion integrally formed on a location of an outer peripheral side of the film portion while being supported by the partition member;
a short passage formed in the partition member at a location of an outer peripheral side of a support portion that supports the annular retaining portion of the moveable film for permitting communication between the pressure receiving chamber and the equilibrium chamber; and
a valve member that switches between a communicating state and a shut off state of the short passage being provided projecting to the outer peripheral side from the annular retaining portion, the valve member having a thick walled part projecting from the annular retaining portion to the outer peripheral side and a thin walled part which gradually becomes thinner toward a projection tip side projecting further to the outer peripheral side from the thick walled part,
wherein the thin walled part rises toward a pressure receiving chamber side within the short passage and is elastically pressed on an inner wall surface of the short passage,
wherein the pressure of the pressure receiving chamber is applied through the short passage to a pressure receiving chamber side surface of the thick walled part, while an equilibrium chamber side surface of the thick walled part is in contact with and supported by the partition member,
wherein the pressure of the pressure receiving chamber is applied to one side of the thin walled part and the pressure of the equilibrium chamber is applied to another side of the thin walled part through the short passage, and
wherein the thin walled part of the valve member projects facing further to the outer peripheral side from the thick walled part with a substantially triangular cross section and a base of the thin walled part is integrally bonded to the thick walled part of the valve member: and an angle formed by the base and a pressure receiving chamber side surface of the thin walled part is an obtuse angle while an angle formed by the base and an equilibrium chamber side surface of the thin walled part is an acute angle.

2. The fluid-filled type vibration damping device according to claim 1, wherein with a free form of the valve member as itself, the thin walled part slopes and rises facing the pressure receiving chamber side with a tapered shape.

3. The fluid-filled type vibration damping device according to claim 1, wherein the annular retaining portion is gripped in a thickness direction of the moveable film by the partition member, and the annular retaining portion is provided with a holding projection projecting in the thickness direction of the moveable film while being pressed by the partition member.

4. The fluid-filled type vibration damping device according to claim 1, wherein the short passage is constituted by including an annular housing extending circumferentially in an interior of the partition member and a communication hole that connects the annular housing to the pressure receiving chamber and the equilibrium chamber, and the valve member of the moveable film is formed in a ring form extending along an entire circumference of the annular retaining portion, and is disposed in the annular housing.

5. The fluid-filled type vibration damping device according to claim 4, wherein the thick walled part of the valve member extends along the entire circumference of the annular retaining portion with an unchanging cross sectional area while the thin walled part of the valve member extends along the entire circumference of the annular retaining portion with an unchanging cross sectional area which is smaller than that of the thick walled part.

6. The fluid-filled type vibration damping device according to claim 1, wherein when positive pressure is applied to the pressure receiving chamber, the thick walled part of the valve member is pressed against the partition member so as to prevent elastic deformation of the thick walled part.

* * * * *